Nov. 15, 1960
F. HARMOS ET AL
2,959,893
METHOD FOR THE TREATMENT OF BEET CLUSTERS
PREPARATORY TO SOWING
Filed July 28, 1958
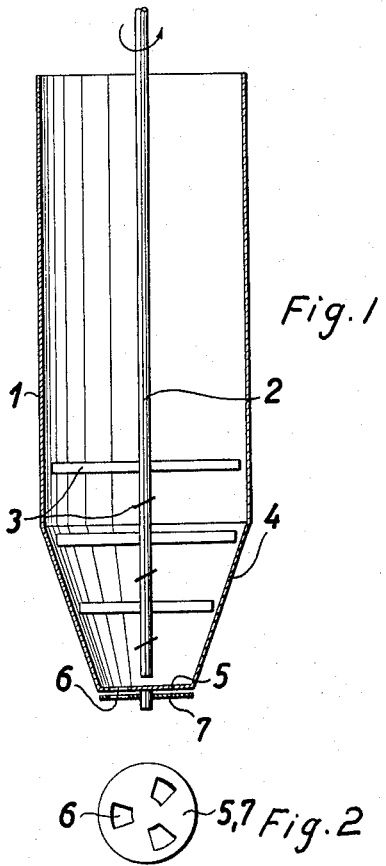
INVENTORS
FERENC HARMOS, PÁL FÖRSTNER,
GYULA CSAPODY, MIKLOS
DEUTSCH, LASZLO LUKACS
By Irwin S. Thompson
ATTY.

United States Patent Office 2,959,893
Patented Nov. 15, 1960

2,959,893
METHOD FOR THE TREATMENT OF BEET CLUSTERS PREPARATORY TO SOWING

Ferenc Harmos, Pál Förstner, Gyula Csapody, Sopronhorpacs, Miklos Deutsch, Taplanszentkereszt, and Lászlo Lukács, Ercsi, Hungary, assignors to Agrimpex Mezogazdasagi Kulkereskedelmi Vallalat, Budapest, Hungary Filed July 28, 1958, Ser. No. 751,532

2 Claims. (Cl. 47—58)

Agricultural research has long been concerned with the problem of rendering sugar beet seeds better suited for being sown. Various methods have been elaborated for answering the problem by polishing or cutting up (segmenting) the beet clusters (beet balls). All these methods, however, have the common feature of being very elaborate and expensive, and of substantially decreasing the biological value of the seeds.

In the course of our experiments directed to eliminate these drawbacks we have found that by subjecting the beet clusters to mutual rubbing (friction) under pressure—a procedure which may be termed "self-abrasion" or "self-wearing-off"—the outer cork integument of the clusters can be removed in such a gentle and careful manner that the germinative power of the seeds, instead of being impaired, is considerably improved.

Such self-abrasion of the clusters is connected with various advantages. As a result of the removal of the highly water-absorbent outer integument, less humidity is required for germination than was hitherto needed. Thus, the percentage of germination remains unchanged and at the same time the sprouting energy is stimulated. These improvements are conspicuous and of highest advantage under conditions of drought when the method according to the invention ensures excellent thriving of the plant. The improved biological value of the seeds is partly due to the fact that soil humidity has better access to the seeds than in the case of untreated beet clusters, as a result of the absence of the cork integument.

The seeds treated according to the invention can be easily and conveniently sorted and sown. Classification according to the size and specific gravity is carried out with a view to separating clusters containing one or two seeds from those containing a larger number of seeds. When clusters having not more than two seeds are sown uniformly, the sprouting of the plant is promoted, thinning out of the beet plants is rendered more convenient and may even be mechanized. Accordingly, a much smaller quantity of sowing seed is required. The exact amount to be sown has to be determined in each individual case, taking into consideration the size of the beet clusters and the germinative power.

Storage and transport of the seeds treated according to the invention calls for less space, whereby the cost of these operations are cut down.

Another advantage of the abrasion treatment resides in that bacteria and parasites or their ova as well as weed seeds are removed from the surface of the clusters. The powder obtained by the abrasion can be utilized for industrial purposes, owing to its cellulose content.

All these advantages are of particular importance for polyploid beets since their sowing seeds have very large clusters but their germinative power and sprouting energy are weaker than for other beet kinds. These drawbacks of polyploid beets are eliminated by the treatment according to the invention.

The significance of the invention is enhanced by the fact that the new method is simple, speedy and inexpensive and makes for increased biological value, as compared with the earlier methods which are complicated and expensive as well as detrimental to the biological value of the seeds.

It is possible that some of these advantages could be achieved also by earlier conventional methods of abrasion. However, the disadvantages resulting from the loss in biological value offsets the advantages attained. The fact that none of these methods has been generally adopted in agriculture corroborates this statement. Accordingly, the problem of treating beet clusters for sowing can be considered as being still in the experimental stage.

For treating the beet clusters according to the invention, a special machine is used having small dimensions, simplicity of design and operation, and relatively high efficiency, adapted to remove the soft outer cork integument of the clusters, whereby the weight of the seeds will be reduced by 20 to 30 percent, and their volume by 40 to 50 percent. Hence, the process, instead of lessening the germinative power, intensifies it.

The drawing illustrates one embodiment of the machine for abrading the seeds according to the invention.

Fig. 1 is a longitudinal section of the cluster container.

Fig. 2 is a plan view of the container bottom or of the rotatable plate thereunder.

The cylindrical container 1 is filled from above with the beet clusters to be treated, up to a height to be determined by practice so as to produce the weight pressure required for obtaining the best results, in consideration of other factors. In the centre line of said container 1 a vertical axle 2 is arranged and kept in slow rotation, e.g. 100 to 180 r.p.m., depending on the size of the machine, by driving means not represented in the drawing. The agitating blades 3 are fixed perpendicular to the axle 2, at several levels over each other. At each level there are two blades fixed to the opposite sides of the axle. Each pair of blades is perpendicular to the next pair. The blades are preferably inclined so as to guide the clusters downwards. To this end they make an acute angle with the horizontal plane in the direction of their advance. This inclination of the blades may be adjustable.

The cylindrical container 1 is conically tapered downwards at 4, and ends in a bottom plate 5 provided with e.g. three segmental discharge openings 6. The size of said openings can be adjusted by turning a plate 7 in contact with the bottom plate 5 and having similar openings.

As it is clear from what has been said before, the blades 3 do not harshly scrape the beet clusters but give rise to a gentle, mutual displacement resulting in a mild abrasion of the clusters. This action of the machine is quite unlike the drastic mechanical effect produced by the earlier devices, such as grinding discs, drums rotating in cylinders filled with grindstone, friction rolls etc.

The abrasion effect is mainly due to the weight of the clusters themselves. Both the velocity of displacement and the pressure can be adjusted so as to achieve the best results. The simplest way for adjusting the abrasion effect is by the said modification of the size of the discharge openings 6 or by alteration of the speed of the axle 2, but, as mentioned above, the same end can be achieved by properly choosing the amount of clusters to be filled into the container 1. A further mode of adjusting the extent of abrasion is to vary the length of the treatment.

The effect of the treatment can be still further improved by admixing to the beet clusters substances apt to increase the mutual abrasion, such as e.g. quartz sand. It is essential to choose for this purpose substances that can be easily separated from the seeds after treatment, for example by sorting.

The equipment described hereinbefore by way of example is well adapted for removing the outer cork integument of the beet clusters in a gentle and careful manner, without injury to the next, more solid covering of the clusters. Hence, the seeds do not suffer violent blows, crushing or too heavy pressure, so that their biological value remains unimpaired.

What we claim is:

1. A method for the treatment of beet clusters preparatory to sowing, comprising filling a cylindrical upright container from above with dry clusters up to an operable height of said container, determining the most favorable height so as to produce the weight pressure required for obtaining the best results and to limit the rise in temperature to a value not affecting the germinating power, then abrading the clusters by mutual rubbing under the pressure of their own weight while maintaining the propelling action of blades located in said container in slow rotation and inclined with their planes relative to the horizontal plane in the direction of their advance, after which the clusters with one or two seeds are separated from those with more seeds unfit for sowing.

2. A method as claimed in claim 1, in which the mutual abrasive effect is aided by the addition of quartz sand easily removable from among the seeds after the treatment is completed.

References Cited in the file of this patent

UNITED STATES PATENTS

| | | |
|---|---|---|
| 875,228 | Witham | Dec. 31, 1907 |
| 1,286,223 | Bunnell | Dec. 3, 1918 |
| 1,637,678 | Camilla | Aug. 2, 1927 |
| 1,735,077 | Files | Nov. 12, 1929 |
| 2,358,208 | Braden | Sept. 12, 1944 |
| 2,386,493 | Moresco | Oct. 9, 1945 |
| 2,545,367 | Mangelsdorf | Mar. 13, 1951 |
| 2,596,568 | Lehman | May 13, 1952 |
| 2,618,103 | Streets | Nov. 18, 1952 |
| 2,731,052 | Grimard | Jan. 17, 1956 |
| 2,731,770 | Rhea | Jan. 24, 1956 |
| 2,789,398 | Willett | Apr. 23, 1957 |

FOREIGN PATENTS

| | | |
|---|---|---|
| 776,292 | Great Britain | June 5, 1957 |